United States Patent
Chung et al.

(10) Patent No.: US 10,107,897 B2
(45) Date of Patent: Oct. 23, 2018

(54) METHOD FOR EVALUATING TYPE OF DISTANCE MEASURED BY LASER RANGE FINDER AND METHOD FOR ESTIMATING POSITION OF MOBILE ROBOT BY USING SAME

(71) Applicant: Korea University Research and Business Foundation, Seoul (KR)

(72) Inventors: Woo Jin Chung, Seoul (KR); Ji Woong Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 141 days.

(21) Appl. No.: 15/105,337

(22) PCT Filed: Oct. 15, 2014

(86) PCT No.: PCT/KR2014/009669
§ 371 (c)(1),
(2) Date: Jun. 16, 2016

(87) PCT Pub. No.: WO2015/102212
PCT Pub. Date: Jul. 9, 2015

(65) Prior Publication Data
US 2017/0003380 A1 Jan. 5, 2017

(30) Foreign Application Priority Data
Dec. 31, 2013 (KR) .......................... 10-2013-0167958

(51) Int. Cl.
*G01C 3/08* (2006.01)
*G01S 7/48* (2006.01)
(Continued)

(52) U.S. Cl.
CPC ............ *G01S 7/4808* (2013.01); *G01S 17/42* (2013.01); *G01S 17/936* (2013.01)

(58) Field of Classification Search
CPC ....... G01S 17/42; G01S 17/936; G01S 7/4808
(Continued)

(56) References Cited

U.S. PATENT DOCUMENTS

| 9,476,980 B2 * | 10/2016 | Thayer .................... G01S 17/08 |
| 2013/0331990 A1 * | 12/2013 | Jeong .................... G01S 17/936 |
| | | 700/259 |
| 2014/0268098 A1 * | 9/2014 | Schwarz .................. G01C 3/08 |
| | | 356/4.07 |

FOREIGN PATENT DOCUMENTS

| JP | 2012-89174 A | 5/2012 |
| JP | 2013-205331 A | 10/2013 |

(Continued)

OTHER PUBLICATIONS

International Search Report dated Feb. 26, 2015 in counterpart International Patent Application No. PCT/KR2014/009669 (4 pages, with English translation).

*Primary Examiner* — Mark Hellner
(74) *Attorney, Agent, or Firm* — NSIP Law (57) ABSTRACT

A method for evaluating the distance type of the measured distance comprises a sample extracting step for extracting a plurality of preliminary samples around a predicted pose; a reference set calculating step for calculating a reference distance set corresponding to each preliminary sample through applying each preliminary sample to a reference distance calculating algorithm which is previously registered, wherein the reference distance set comprises reference distances corresponding to each of a plurality of distance types; a distance type extracting step for extracting a distance type corresponding to each of the reference distance sets based on a smallest distance error among distance errors between each reference distance which compose the reference distance set and the measured distance; and a distance type evaluating step for evaluating a distance type of the (Continued)

measured distance based on the distance type which is extracted in correspondence with each reference distance set.

9 Claims, 7 Drawing Sheets

(51) Int. Cl.
    *G01S 17/42*     (2006.01)
    *G01S 17/93*     (2006.01)

(58) Field of Classification Search
    USPC .......................................................... 356/4.01
    See application file for complete search history.

(56) References Cited

FOREIGN PATENT DOCUMENTS

| | | |
|---|---|---|
| KR | 10-2007-0090864 A | 9/2007 |
| KR | 10-0825919 B1 | 4/2008 |
| KR | 10-0998709 B1 | 12/2010 |
| KR | 10-2011-0085785 A | 7/2011 |
| KR | 10-2012-0019661 A | 3/2012 |
| KR | 10-1190616 B1 | 10/2012 |

* cited by examiner

METHOD FOR EVALUATING TYPE OF DISTANCE MEASURED BY LASER RANGE FINDER AND METHOD FOR ESTIMATING POSITION OF MOBILE ROBOT BY USING SAME

CROSS-REFERENCE TO RELATED APPLICATIONS

This application is a U.S. National Stage Application of International Application No. PCT/KR2014/009669, filed on Oct. 15, 2014, which claims the benefit under 35 USC 119(a) and 365(b) of Korean Patent Application No. 10-2013-0167958, filed on Dec. 31, 2013, in the Korean Intellectual Property Office.

TECHNICAL FIELD

The invention relates to a method for evaluating a distance type of a measured distance measured by laser range finder and a method for localization of a mobile robot using the same and in particular to a method for evaluating a distance type of a measured distance measured by a laser range finder and a method for localization of a mobile robot using the same which is robust to an object with a penetrability of a light such as a glass wall, open and close of a door, or unknown obstacles, etc. in localization using the measured distance measured by the laser range finder.

BACKGROUND ART

Indoor localization of a mobile robot has received much attention with increasing of using indoor mobile robots. In particular, localization method of the mobile robot using a laser range finder is widely researched and used owing to their high accuracy and long range of sensing.

In localization method using the laser range finder, pose of the mobile robot is assumed by sensing a natural landmark or an artificial landmark in indoor environment. A localization method based on the natural landmark uses distance or reflection intensity measured from objects in a driving environment.

On the other hand, in a localization method based on the artificial landmark, a reflector which has reflection intensity different from surrounding objects is installed around the driving environment, the pose of the mobile robot is estimated by sensing the reflector through the laser range finder. However, it is more efficient that the natural landmark is fully used, excluding environment where installation of the artificial landmark is inevitable, because the localization method based on the artificial landmark need to considerable expense and effort for installing the artificial landmarks.

The serious problem that is faced when the localization method based on the natural landmark is used is an error of a measured distance which is measured by the laser range finder. The error of the measured distance is caused by unknown obstacles or a refection property of an environment of the localization.

The localization problems due to the unknown obstacles can be solved by a design of an observation model which is robust to the partial distance error. For example, in a paper of Moon, etc.「Observation Likelihood Model Design and Failure Recovery Scheme toward Reliable Localization of Mobile Robots (International Journal of Advanced Robotic Systems, vol. 7, no. 4, pp. 113-122, 2010.)」, a scan matching method using a difference of area between a scan image and a reference image was suggested.

Herein, the reference image is the laser image which is predicted in a potential pose of the mobile robot based on map information. The method suggested in the paper is robust to the partial distance error because the method uses not a probability multiplication according to the distance errors of each laser beam but a probability model using the difference of the area of total scan images.

A beam model was suggested in a paper of S. Thrun, D. Fox and W. Burgard「Probabilistic Robotics (The MIT Press, 2005.)」. The beam model dealt with the localization problem due to the unknown obstacles by statistically adding with possibility of occurrence of the error due to the adjacent obstacles.

However, the method which is suggested in the above-mentioned papers has a limit that only the partial distance error due to the unknown obstacles is solved. If the distance errors are occurred in the large number of the direction due to the reflective characteristic of the localization environment, the method which is suggested in the above-mentioned paper cannot assure itself of the performance.

Meanwhile, the typical environment which causes the distance error by the reflective characteristic of the environment is indoor environment which is surrounded with glass walls. The measured value of the laser range finder reflected from the general object is a distance which is measured by a diffuse reflection from an object what the laser beam reaches firstly.

Figure 1:
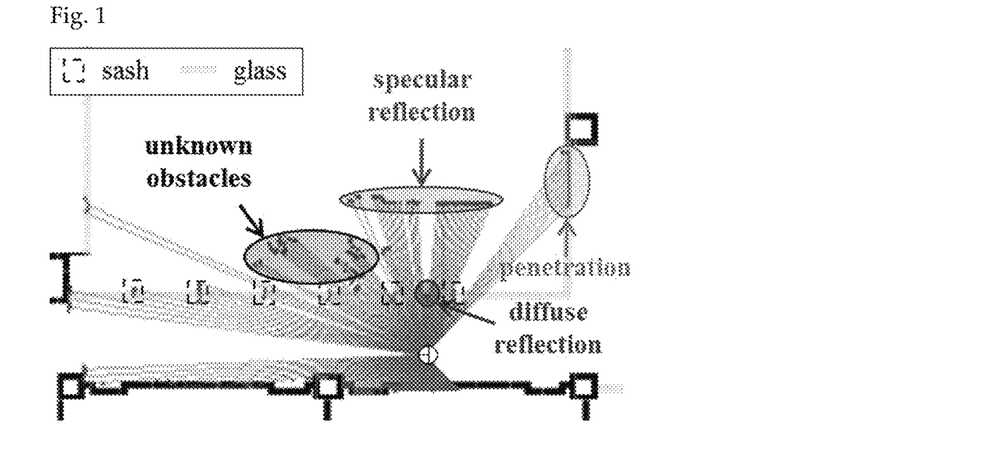
FIG. 1 represents a reflective characteristic of a laser beam in a glass wall.

However, as shown in FIG. 1, when the laser beam from the laser range finder reaches the transparent object such as the glass, the measured value of the laser range finder is changed depending on various reflection phenomena such as a diffuse reflection, a specular reflection, and a penetration, etc. in the glass wall. It is difficult that the reference image which is compared with the scan image for the scan matching is determined because of such the refection property.

Actually, the localization methods which consider the reflective characteristic of the laser range finder in the driving environment have been widely studied. For example, a paper of M. Bennewitz「Utilizing Reflection Properties of Surfaces to Improve Mobile Robot Localization (IEEE International Conference on Robotics & Automation, 2009.)」deals with the localization problems which are occurred when the low-cost laser range finder cannot detect the object with low reflectivity. However, the reflective characteristic of the glass wall is more complicated than the object with low reflectivity.

In a paper of S. Yang「On Solving Mirror Reflection in LIDAR Sensing (IEEE/ASME TRANSACTIONS ON MECHATRONICS, vol. 16, no. 2, pp. 255-265, 2011.」, a method for detecting and tracking a position of a mirror through analyzing the measured distance values is disclosed. However, the method has limitation that various reflections which can be occurred in the glass wall not in the mirror don't be considered.

Also, in a paper of M. Awais「Improved Laser-based Navigation for Mobile Robots (International Conference on Advanced Robotics, 2009.)」, the technique for statistically predicting the type of the sensor's output according to the distance and the incidence angle of the beam incident toward the direction of the glass wall based on the light characteristics is disclosed. Even though the method disclosed in the paper of M. Awais uses the light characteristics of the laser beam, it is difficult to predict the type of the scan distance which is occurred by the actual glass wall.

DISCLOSURE OF THE INVENTION

Technical Problem

An object of the present invention is to solve the above problems and the present invention provides a method for evaluating a distance type of a measured distance measured by laser range finder and a method for localization of a mobile robot using the same which can improve performance of a local localization of the mobile robot in an environment which is surrounded with a glass wall.

Also, the other object of the present invention is to solve the above problems and the present invention provides a method for evaluating a distance type of a measured distance measured by laser range finder and a method for localization of a mobile robot using the same which can assure a robust localization in an environment with an object with a penetrability of a light such as a glass wall, open and close of a door, or unknown obstacles, etc.

Technical Solution

The above purpose can be achieved by a method for evaluating a distance type of a measured distance measured by a laser range finder, comprising the steps of: a sample extracting step for extracting a plurality of preliminary samples around a predicted pose; a reference set calculating step for calculating a reference distance set corresponding to each preliminary sample through applying each preliminary sample to a reference distance calculating algorithm which is previously registered, wherein the reference distance set comprises reference distances corresponding to each of a plurality of distance types; a distance type extracting step for extracting a distance type corresponding to each of the reference distance sets based on a smallest distance error among distance errors between each reference distance which compose the reference distance set and the measured distance; and a distance type evaluating step for evaluating a distance type of the measured distance based on the distance type which is extracted in correspondence with each reference distance set.

Herein, when the distance types which are extracted in correspondence with each reference distance set are equal, the corresponding distance type is evaluated as the distance type of the measured distance in the distance type evaluating step.

Also, the predicted pose is calculated based on a pose which is estimated at previous step and an odometry measuring value in the sample extracting step.

Also, the preliminary samples are extracted through systematic sampling at a predetermined direction angular interval around the predicted pose in the sample extracting step.

Further, the reference distance calculating algorithm comprises a ray casting algorithm; and wherein a pose of the preliminary sample and a grid map which is previously registered are applied to the ray casing algorithm such that reference distance corresponding to a diffuse reflection distance, a specular reflection distance and a penetration distance at the pose of the preliminary sample is calculated, respectively based on the grid map in the reference set calculating step.

Also, wherein the distance type corresponding to one reference distance set in the distance type extracting step is extracted via the steps of: calculating a distance error between each reference distance which compose the reference distance set and the measured distance; extracting the smallest distance error among the calculated distance errors; and extracting the distance type corresponding to the extracted distance error as the distance type corresponding to the reference distance set when the extracted distance error is smaller than a predetermined error limit.

Also, the error limit is calculated proportionally to the measured distance.

Also, the reference distance set comprises the reference distance corresponding to at least 4 distance types, respectively.

Meanwhile, the above purpose can be achieved by a method for localization of a mobile robot using a laser range finder, comprise the steps of: calculating a predicted pose of the mobile robot at a present step; measuring a plurality of measured distances by scanning of the laser range finder at the present step; applying each measured distance to the method for evaluating the distance type, such that evaluates the distance type of each measured distance; applying the plurality of the measured distances to a scan matching method, wherein the evaluated distance type is applied to a reference distance in the scan matching method; and localizing the mobile robot based on a matching error according to the scan matching method.

Advantageous Effect

According to the present invention, a method for evaluating a distance type of a measured distance measured by laser range finder and a method for localization of a mobile robot using the same is provided which can improve performance of a local localization of the mobile robot in an environment which is surrounded with a glass wall.

Also, according to the present invention, a method for evaluating a distance type of a measured distance measured by laser range finder and a method for localization of a mobile robot using the same is provided which can assure a robust localization in an environment with an object with a penetrability of a light such as a glass wall, open and close of a door, or unknown obstacles, etc.

| List of Reference Numerals | |
|---|---|
| 100: mobile robot | 200: glass wall |
| 300: unknown obstacle | |

BEST MODE FOR CARRYING OUT THE INVENTION

The present invention relates to a method for evaluating a distance type of a measured distance measured by a laser range finder. The method for evaluating the distance type of the measured distance measured by the laser range finder according to the present invention comprises the steps of: a sample extracting step for extracting a plurality of preliminary samples centering around a predicted pose; a reference set calculating step for calculating a reference distance set corresponding to each preliminary sample through applying each preliminary sample to a reference distance calculating algorithm which is previously registered, wherein the reference distance set comprises reference distances corresponding to each of a plurality of distance types; a distance type extracting step for extracting a distance type corresponding to each of the reference distance sets based on a smallest distance error among distance errors between each reference distance which compose the reference distance set and the measured distance; and a distance type evaluating step for evaluating a distance type of the measured distance based on the distance type which is extracted in correspondence with each reference distance set.

MODE FOR CARRYING OUT THE INVENTION

Hereinafter, embodiments of the present invention will be explained in detail referring to attached drawings.

A reflective characteristic in a glass wall 200 will be check before explanation about a method for evaluating a distance type of a measured distance measured by a laser range finder and a method for localizing a mobile robot using the same according to the present invention.

Figure 2:
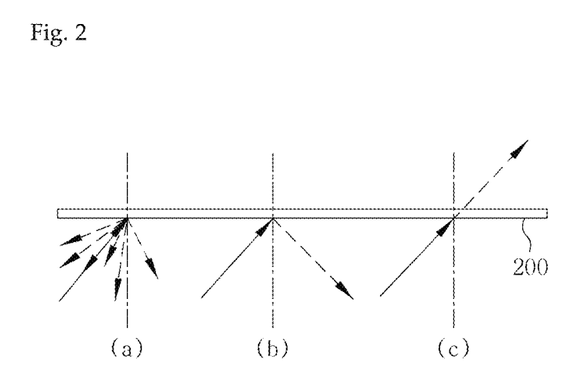
FIG. 2 represents whole possible paths when the laser beam reaches the glass wall.
Figure 3:
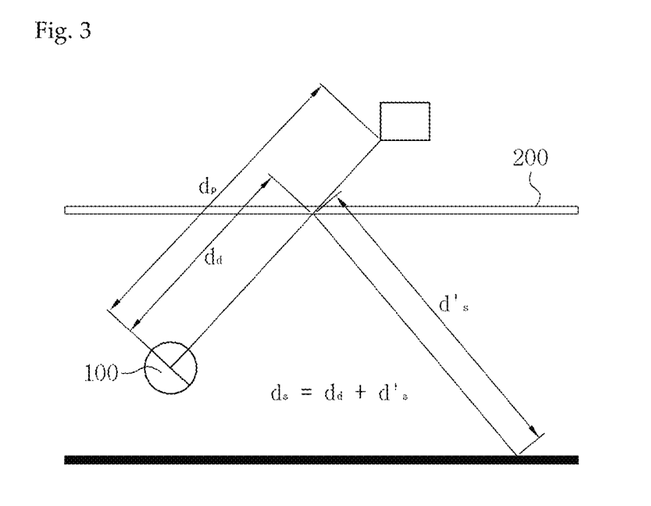
FIG. 3 represents distance types detected according to a reflective characteristic of the laser beam.

The laser range finder is an optical sensor that relies on characteristics of a light. Thus, a direction of progress of a laser beam which is chanced after the laser beam from the laser range finder reaches the glass wall 200 is closely related with the characteristics of the light. FIG. 2 represents whole possible paths when the laser beam reaches the glass wall 200. FIG. 2(a) represents a diffuse reflection, FIG. 2(b) represents a specular reflection, and FIG. 2(c) represents a penetration.

Referring to FIG. 2, the diffuse reflection is a phenomenon that the laser beam is reflected to various directions on the glass wall 200, diffusely. Because a degree of the diffuse reflection is dependence on a roughness of a refection surface, rate of the diffuse reflection among whole reflection on the smooth glass wall is small relatively. As a distance between the glass wall 200 and the laser range finder becomes longer, an incidence angle of the laser beam toward the glass wall 20 becomes larger, and a transparency of the glass wall 200 becomes higher, an intensity of the diffuse reflection becomes lower.

Due to the characteristics of the diffuse reflection as mentioned above, a respectable amount of light which does not penetrate is reflected as the specular reflection. Also, light which penetrates the glass wall 200 is refracted, actually. However, in the present invention, it is assumed that effect of the refraction can be ignored because most glass walls 200 in the driving environment are thin.

On the authority of the reflection characteristics of light on the glass wall 200 as mentioned above, the laser range finder can measure three distance, $d_d$, $d_s$ and $d_p$ in the direction of the glass wall 200. Herein, $d_d$ is a measured distance by the diffuse refection, $d_s$ is a measured distance by the specular reflection, and $d_p$ is a measured distance by the penetration.

The measured distance of the laser range finder can be measured by the beam whose refection intensity is larger than the predetermined intensity. However, because it is difficult to predict the reflection intensity of each beam, it is difficult to decide that the measured distance which is measured by the laser range finder is $d_d$, $d_s$, or $d_p$.

Some preceding research try to model a probability that the measured distance will be the distance by the diffuse reflection using the reflection intensity of the diffuse reflection. However, because the intensity of the diffuse reflection can be varied depending on the incidence angle, the distance, and the transparency, etc. on the same glass wall 200, as mentioned above, it is difficult to model the probability. It is same of the reflection beam by the specular reflection and the penetration.

Thus, in the present invention, for evaluating a distance type of the measured distance which is measured by the laser range finder, the present invention uses the measured distance itself, not the reflection intensity of the laser beam. Therefore, the distance type can be decided accurately without regard to environmental change of the glass wall 200.

Hereinafter, referring to FIG. 4, the method for evaluating the measured distance measured by the laser range finder according to the present invention will be described in detail.

First, a measured distance at a present step is measured by scanning of the laser range finder, and then the measured distance and a predicted pose is inputted S30. Herein, a grid map which is a map information about a driving environment of the mobile robot 100 is previously registered, and the grid map is applied to a process for calculating a reference distance set which will be described below.

And then, the predicted pose is an approximate pose in a present pose of the mobile robot 100 at the present step, and is calculated based on a pose of the mobile robot 100 which is estimated at the previous step and an odometry measuring value at the present step.

Figure 4:
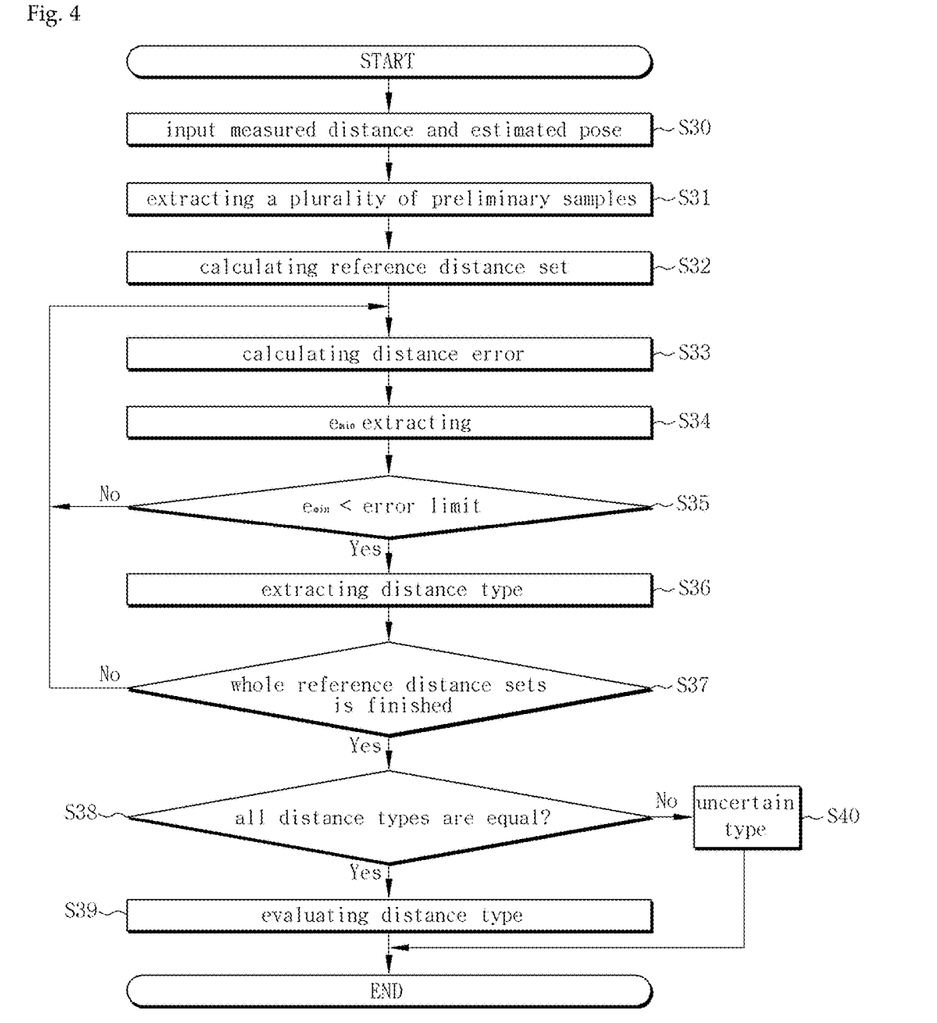
FIGS. 4 and 5 represent a method for evaluating a distance type of a measured distance measured by a laser range finder according to the present invention.

Herein, the process for evaluating the distance type in FIG. 4 is a process for evaluating the distance type corresponding to the measured distance which is measured at one direction, namely a particular angle during scanning processing of the laser range finder. Thus, the process for evaluating the distance type in FIG. 4 is carried out for each scan angle of the laser range finder.

Referring to FIG. 4, the measured distance and the predicted pose are inputted S30, and then a plurality of preliminary samples comprising the predicted pose are extracted centering around the predicted pose S31. And then a reference distance set corresponding to each preliminary sample is calculated S32.

As described above, the plurality of the preliminary sample are extracted centering around the predicted pose and the reference distance sets corresponding to the extracted preliminary samples are extracted instead of just one reference distance set according to the predicted pose of the mobile robot 100 in the present invention. Therefore, uncertainty of the distance type evaluation can be remarkably reduced.

Herein, in one embodiment of the present invention, the preliminary samples are extracted through systematic sampling at a predetermined direction angular interval centering around the predicted pose, as an example. If the preliminary samples are extracted through random sampling, the case that the poses of the preliminary samples are similar to each other may stochastically occur, and distance type evaluation of the measured distance using the plurality of the reference distance sets which is calculated centering around the poses of the similar preliminary samples may have high probability of inaccuracy.

On the other hand, because the preliminary samples are extracted through the systematic sample at a regular direction angular interval, the reference distance set which is calculated centering around such the preliminary samples can show the tendency of the reference distances within the particular angular range. Therefore, it is more accurate for evaluating the distance type of the measured distance.

Herein, the reference distance set is calculated through applying the preliminary samples to a reference distance calculating algorithm which is previously registered, and the reference distance set comprises reference distances corresponding to each of the plurality of distance types. In the present invention, the reference distance comprises the reference distance corresponding to each of at least four distance types, as an example.

In one embodiment of the present invention, the distance type comprises the diffuse reflection, the penetration reflection, and the specular reflection with consideration of the glass wall 200, as an example, and the reference distance which forms the reference distance set is calculated corresponding to a diffuse reflection distance, a penetration distance, and a specular reflection distance, as an example. Herein, the present invention uses a second penetration distance with consideration of case that the laser beam penetrates and reflects from the plurality of the glass walls 200, as an example. Therefore, the number of the reference distance and the distance type of the reference distance set is four, as an example.

Herein, the method for evaluating the distance type according to the present invention, a ray casting algorithm is applied to the reference distance calculating algorithm, as an example. Also, the preliminary sample and the grid map as mentioned above are applied to the ray casting algorithm, such that the reference distance set corresponding to the plurality of the reference distance, that is the diffuse reflection distance, the specular reflection distance and the penetration distance is calculated.

Generally, the ray casting algorithm provides a method for finding a position of a first object which is met by the laser beam. Thus, the reference distance which is calculated through the conventional ray casting algorithm may be the diffuse reflection distance.

Accordingly, in the present invention, the ray casting algorithm is modified in order to calculate the reference distance corresponding to the specular reflection distance and the penetration distance using the pose of the preliminary samples and the grid map.

For example, with regard to the reference distance corresponding to the specular reflection distance, the laser beam emitted from the laser range finder reaches a first obstacle with the incidence angle, reflects from the first obstacle with the refection angle equal to the incidence angle, and reaches the other obstacle. The reference distance corresponding to the specular reflection distance is calculated by the total traveling distance of the laser beam from the laser range finder to the other obstacle.

Similarly, with regard to the reference distance corresponding to the penetration distance, the laser beam emitted from the laser range finder reaches the first obstacle, penetrates the first obstacle without change of direction, and reaches next obstacle. The reference distance corresponding to the penetration distance is calculated by the total traveling distance of the laser beam from the laser range finder to next obstacle. The reference distance corresponding to the second penetration distance can be calculated through the same way.

According to the process as mentioned above, the reference distance sets corresponding to each preliminary sample are calculated, and then the distance type corresponding to each reference distance set is extracted through comparing each reference distance set and the measured distance S36.

In more detail referring to FIG. 4, an distance error between the plurality of the reference distance which composes one reference distance set and the measured distance is calculated S33. As mentioned above, the distance error between four reference distances and the measured distance, respectively, thus four distance errors are calculated.

And then, the minimum distance error $e_{min}$ among four distance errors is extracted S34. That is, the most similar reference distance with the measured distance can be extracted among the reference distance which is calculated on the basis of the grid map.

Herein, in the present invention, it is determined whether the minimum distance error $e_{min}$ is smaller than an error limit S35. And then, when the minimum distance error $e_{min}$ is smaller than the error limit, the distance type of the reference distance corresponding to the minimum distance error is extracted as the distance type of the present reference distance set that is the distance type of the present preliminary sample.

Herein, the error limit reflects difference of a minimum distance that the measured distance and the reference distance can be determined as same type when the measured distance and the reference distance are compared. That is, if the distance error is larger than the error limit, the distance type of the distance error cannot be extracted as the distance type in spite of the minimum distance error.

Figure 5:
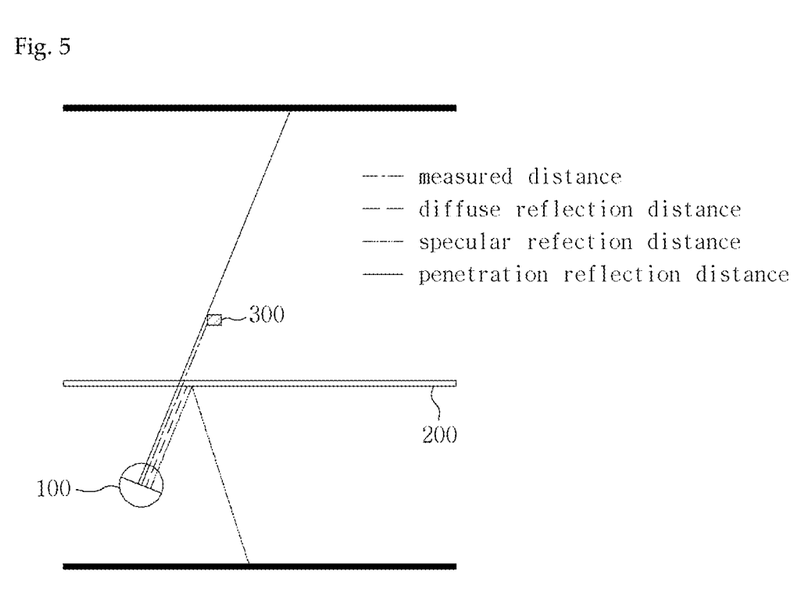

For example, as shown in FIG. 5, when the laser beam which penetrates the glass wall returns the laser range finder after reflecting from an unknown obstacle 300, that is, the laser beam returns the laser range finder in the state that the laser range finder cannot detected the laser beam due to the low reflective intensity of the diffuse reflection, the measured distance does not match with anything among the diffuse reflection, the specular reflection, and the penetration reflection.

At this time, if there is no process for checking the distance error by the error limit, one of the reference distances corresponding to the diffuse reflection, the specular reflection and the penetration reflection is extracted as the minimum distance error. Consequentially, it causes the measuring error that the distance type of the minimum distance error is extracted.

The measuring error can be filtered by the error limit. As shown in FIG. 5, the measured distance which is measured by the laser beam reflected from the unknown obstacle 300 (comprising the unknown obstacle 300 which is located opposed to the glass wall 200) which is located on the driving path of the mobile robot 100 is evaluated as an uncertain type, and is excluded, such that the present invention can provide the effect that the measuring error of the localization which is caused by the unknown obstacle 300 can be removed through the method for evaluating the distance type according to the present invention.

In the present invention, the error limit is calculated proportionally to the measured distance, as an example. In one embodiment of the present invention, the preliminary samples are extracted through the systematic sampling at the particular direction angular interval, as an example, such that the measured distance is applied to set-up the error limit because a deviation of the reference distance according to the change of the direction angle is affected by the measured distance.

When the extracting process for extracting the distance type of one reference distance set is finished through above-mentioned process, the distance types of whole the reference distance sets are extracted through step S33 to S37.

And then, when the extracting process for extracting the distance types of whole the reference distance sets is finished S37, it is determined whether all distance types are equal S38. If all distance types are equal, the distance type is evaluated as the distance type of the present measured distance S39. On the other hand, all distance type is not equal to each other in the step S38, and the present measured distance is evaluated as the uncertain type S40.

Herein, in the embodiment of the present invention, the distance type of the measured distance is evaluated when all distance types are equal, such that the accuracy of the evaluation of the distance type of the measured distance is improved. The accuracy of the localization cannot be affected even though the measured distance which is evaluated as the uncertain type is excluded from the localization which is explained later, because above-mentioned process is carried out for the measured distance which is measured at one scan among whole scan process of the laser range finder, that is, one angle.

For example, if the laser range finder scans around 360° by 1°, 360 measured distances can be measured during one scanning process. Herein, the accuracy of the localization cannot be lowered even though several measured distance among the 360 measured distances are evaluated as the uncertain type and excluded from the localization which is explained later.

In above-mentioned embodiment, as shown in FIG. 4, it is explained that the plurality of the preliminary samples are extracted, the reference distance sets corresponding to each preliminary sample are extracted, and the reference types of each reference distance type are evaluated, as an example. However, a technical idea of the present invention cannot be limited in the sequence as shown in FIG. 4.

For example, the process: extracting of one preliminary sample→extracting reference distance set→calculating distance error→extracting minimum distance error→comparing with error limit>extracting distance type, may be carried out though extracting each preliminary sample. That is, the process as shown in FIG. 4, is not limited in the process that the reference distance sets corresponding to each preliminary sample are calculated S32 after all the preliminary samples are extracted S31.

Figure 6:
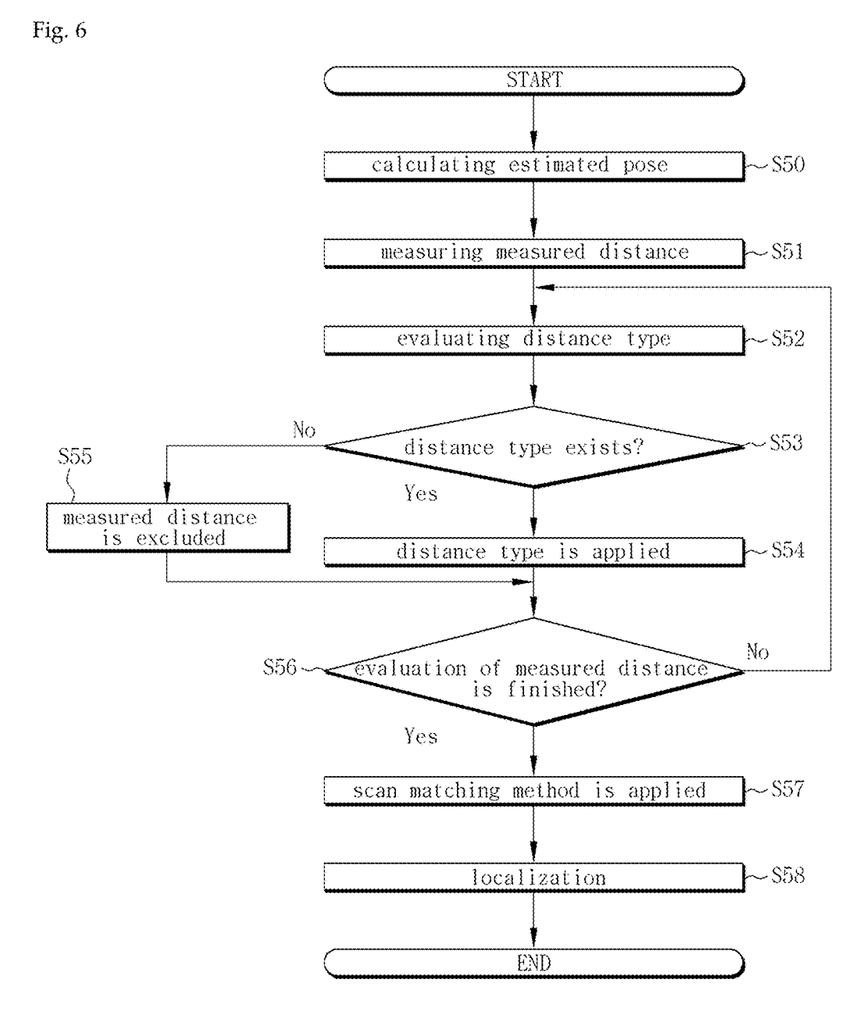
FIGS. 6 and 7 represent a method for localizing a mobile robot using the laser range finder according to the present invention.

Herein after, localization of the mobile robot 100 according to the present invention will be explained in detail referring to FIG. 6.

First, a predicted pose of the mobile robot 100 is calculated at a present step S50. Herein, the predicted pose is an approximate pose of the mobile robot 100 at the present step, and calculated based on the pose of the mobile robot 100 which was estimated at the previous step and the odometry measuring value at the present step.

And then, a plurality of measured distances corresponding to each direction is measured by scanning of the laser range finder of the mobile robot 100 S51. And then, the distance type corresponding to one measured distance is evaluated S52. Herein, the method for evaluating the distance type according to the present invention which is described above is applied to evaluation of the distance type corresponding to the measured distance.

If the distance type exists in the evaluation of the distance type corresponding to the on measured distance S53, that is, if the distance types corresponding to all reference distance sets are equal in the step S38 in FIG. 4, the distance type is applied to the localization of the mobile robot 100, S54. On the other hand, if the distance type doesn't exist, that is, if the step S38 in FIG. 4 is not satisfied, the measured distance is excluded from the localization of the mobile robot 100, S55.

Though the process which is mentioned above, when the evaluation of the distance type corresponding to one measured distance is finished in the present step, the evaluation of the distance types corresponding to all measured distances are performed by the steps S52 to S55, and then the evaluation for all measured distance is finished S56.

And then, the plurality of the measure distances is applied to a scan matching method. Herein, the distance type corresponding to the measured distance is applied to a reference distance in the scan matching method, and the reference distance in the scan matching method is applied. That is, the measured distance of which the distance type is uncertain is excluded among the measured distances measured by the laser range finder. Also, the reference distance corresponding to the measured distance which is applied to the scan matching method is the reference distance corresponding to the distance type of the measured distance, that is, the reference distance corresponding to one of the diffuse reflection distance, the specular reflection distance and the penetration distance.

And then, the pose of the mobile robot 100 is estimated based on a matching error according to the scan matching method S58, such that the more accurate localization to which the distance type of the measured distance is applied is finished.

Herein after, one example of the localization of the mobile robot 100 using the method for evaluating the distance type of the measured distance according to the present invention will be explained. Herein, Monte Carlo Localization among the localization schemes is applied, as an example.

The Monte Carlo Localization complies with Bayes Filtering algorithm, basically, and comprises the three steps which are composed of a prediction step, a measurement update step, and a resampling step.

First, in the prediction step, $\overline{bel}(X_{n,t})$ which is a belief of each sample pose is calculated using each sample pose at the previous step and the odometry measuring value at the present step by a formula 1, before the each sample pose comprises a observation result at the present step.

$$\overline{bel}(X_{n,t}) = \int p(X_{n,t}|u_t, X_{n,t-1}) bel(X_{n,t-1}) dX_{t-1}, 1 \leq n \leq N \quad \text{[Formula 1]}$$

Herein, N is the number of the samples, $p(X_{n,t}|u_t, X_{n,t-1})$ is a motion model. In the present invention, an odometry motion model is applied to the motion method, as an example.

In the measurement update step, $bel(X_{n,t})$ which is a belief corresponding to poses of each sample at the present step is calculated using the observation result in the present step, that is, the pose (location and direction) of the mobile robot 100 and the grid map information by a formula 2.

$$bel(X_{n,t}) = \eta p(Z_t|X_{n,t}, M) \overline{bel}(X_{n,t}) \quad \text{[Formula 2]}$$

Herein, $\eta$ is a normalization constant, $p(Z_t|X_{n,t}, m)$ is an observation model. In the present invention, a probability distribution depending on the matching error using a difference of area is used as the observation model, and the scan matching method in FIG. 7 is applied to calculation of the matching error using the difference of area, such that the reference distance to which the distance type evaluation of the measured distance is applied is used.

Herein, the method for evaluating the distance type of the measured distance according to the present invention is carried out before the measurement update step, and is applied to calculation of the matching error in the measurement update step.

In more detail, when the method for evaluating the distance type of the measured distance according to the present invention is finished, likelihoods of all samples which are used in Monte Carlo Localization are updated by the observation model.

Figure 7:
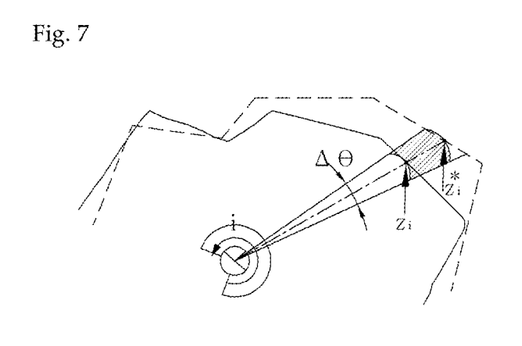

FIG. 7 represents the matching error using the difference of area. As mentioned above, in the present invention, the probability distribution depending on the matching error using the difference of area is used as the observation model, as an example. Referring to FIG. 7, the matching error is calculated using the deference of area between a scan image of the laser range finder, that is, the measured distance and an image which is represented by the reference distance calculated from the grid map. The matching error is calculated by a formula 3.

$$E(X_{n,t}) = \left\{ \frac{\sum_i |(z_{i,t}^*)^2 \Delta\gamma - (z_{i,t})^2 \Delta\gamma|}{\sum_i |(z_{i,t}^*)^2 \Delta\gamma + (z_{i,t})^2 \Delta\gamma|} \right\} \times 100 \quad \text{[Formula 3]}$$

In the formula 3, $Z_{i,t}$ is a measured distance which is measured at i-th, $Z^*_{i,t}$ is the i-th reference distance, and $\Delta\gamma$ is an angular resolution of the laser range finder.

In the formula 3, the distance type evaluated corresponding to the measured distance is applied to the calculation of $Z^*_{i,t}$ such that the reference distance according to corresponding distance type, that is, the reference distance corresponding to one of the diffuse reflection distance, the penetration distance and the specular reflection distance is applied. Also, the measured distance which is determined as the uncertain type is excluded from application of the formula 3, such that error of localization due to miscalculation can be reduced.

Through the above process, when calculation of the matching error of the poses of all samples is finished, the likelihoods of all samples are updated using a Gaussian probability distribution according to the size of the matching error. That is, the samples with low weighting is replace with the sample with high weighting through the resampling step, such that bel($X_{n,t}$) of poses of all samples are changed toward same value after the resampling step for all samples.

In the above process, localization of the mobile robot at the present step is estimated through the matching error of each sample which is calculated in the measurement update step. Herein, various methods which are publicly known can be applied to the localization of the mobile robot 100 using the matching error. For example, pose of the sample where the matching error is the lowest is estimated as the pose of the mobile robot 100. Also, pose of the mobile robot can be estimated by using weighted average of pose of all samples.

In the above mentioned embodiment, The Monte Carlo Localization is applied as the localization method according to the present invention, as an example. In addition, the localization method according to the present invention can be applied to the localization scheme such as Kalman Filter, Extended Kalman Filter, and Unscented Kalman Filter, etc. to which the sensor model using the scan matching method of the laser range finder is applied.

Also, in the above mentioned embodiment, the matching error using the difference of the area in the scan matching method is used, as an example. However, another method using the difference between the reference distance and the measured distance can be applied.

Also, in the above mentioned embodiment, it is explained that the error of the localization due to the glass wall 200 in environment with the glass wall 200 can be decreased, as an example. However, in spite of the change of environment such as the change of the measured distance due to open of close of a door which doesn't registered the map, the change is excluded from the localization such that more accurate localization can be carried out, such as the error of the localization due to the unknown obstacle 300 can be solved by the method for evaluating the distance type of the measured distance according to the present invention, as mentioned above.

Also, in the above mentioned embodiment, when all distance types of each reference distance set are equal, that distance type is evaluated as the distance type of the measured distance, as an example. In addition, even when the distance types of each reference distance set are equal over predetermined number of times, that distance type can be evaluated as the distance type of the measured distance.

The scope of the present invention is not limited to the above described embodiments and is determined by the accompanying claims. It is apparent that various variations or modifications can be made within the scope of the claims by those skilled in the art.

INDUSTRIAL APPLICABILITY

The present invention can be applied to a field of an unmanned mobile robot, and to a field where an accuracy of the localization of the unmanned mobile robot such as a security robot, a service robot, etc. can be improved.

The invention claimed is:

1. A method for evaluating a distance type of a measured distance measured by a laser range finder, the method comprising:
    extracting preliminary samples around a predicted pose;
    calculating a reference distance set corresponding to each of the preliminary samples through applying each of the preliminary samples to a reference distance calculating algorithm which is previously registered, wherein the reference distance set comprises reference distances corresponding to each of distance types;
    extracting a distance type corresponding to each of the reference distance sets including the reference distance set, based on a smallest distance error among distance errors between each of the reference distances, which compose the reference distance set and the measured distance; and
    evaluating a distance type of the measured distance based on the extracted distance type.

2. The method for evaluating the distance type of the measured distance measured by the laser range finder according to claim 1, wherein in response to the distance types which are extracted in correspondence with each reference distance set being equal, the corresponding distance type is evaluated as the distance type of the measured distance in the evaluating of the distance type.

3. The method for evaluating the distance type of the measured distance measured by the laser range finder according to claim 1, wherein the predicted pose is calculated based on a pose which is estimated at previous step and an odometry measuring value in the extracting of the preliminary samples.

4. The method for evaluating the distance type of the measured distance measured by the laser range finder according to claim 1, wherein the extracting of the preliminary samples comprises extracting the preliminary samples through systematic sampling at a predetermined direction angular interval around the predicted pose.

5. The method for evaluating the distance type of the measured distance measured by the laser range finder according to claim 1, wherein
the reference distance calculating algorithm comprises a ray casting algorithm, and
in the calculating of the reference distance set, a pose of the preliminary sample and a grid map which is previously registered are applied to the ray casting algorithm such that a reference distance corresponding to a diffuse reflection distance, a specular reflection distance, and a penetration distance at the pose of the preliminary sample, is respectively calculated based on the grid map.

6. The method for evaluating the distance type of the measured distance measured by the laser range finder according to claim 1, wherein the extracting of the distance type comprises extracting the distance type by
calculating a distance error between each reference distance in the reference distance set and the measured distance,
extracting the smallest distance error among the calculated distance errors, and
extracting a distance type corresponding to the extracted distance error, as the distance type corresponding to the reference distance set, in response to the extracted distance error being smaller than a predetermined error limit.

7. The method for evaluating the distance type of the measured distance measured by the laser range finder according to claim 6, wherein the predetermined error limit is calculated proportionally to the measured distance.

8. The method for evaluating the distance type of the measured distance measured by the laser range finder according to claim 1, wherein the reference distances respectively correspond to at least 4 distance types.

9. A method for localization of a mobile robot using a laser range finder, the method comprising:
calculating a predicted pose of the mobile robot;
measuring distances by scanning with the laser range finder;
applying the method of claim 1 to evaluate the distance type of each measured distance;
applying the measured distances to a scan matching method in which the evaluated distance type is applied to a reference distance; and
localizing the mobile robot based on a matching error according to the scan matching method.

\* \* \* \* \*